July 19, 1938.  F. R. ZIMMERMAN  2,124,329
SPRING HEATING MACHINE
Filed June 29, 1936   7 Sheets-Sheet 1

Inventor:
Fred R. Zimmerman,
By: Rudolph Wm. Lotz
Attorney.

Witness:
E. Camporini

July 19, 1938.   F. R. ZIMMERMAN   2,124,329
SPRING HEATING MACHINE
Filed June 29, 1936   7 Sheets-Sheet 4
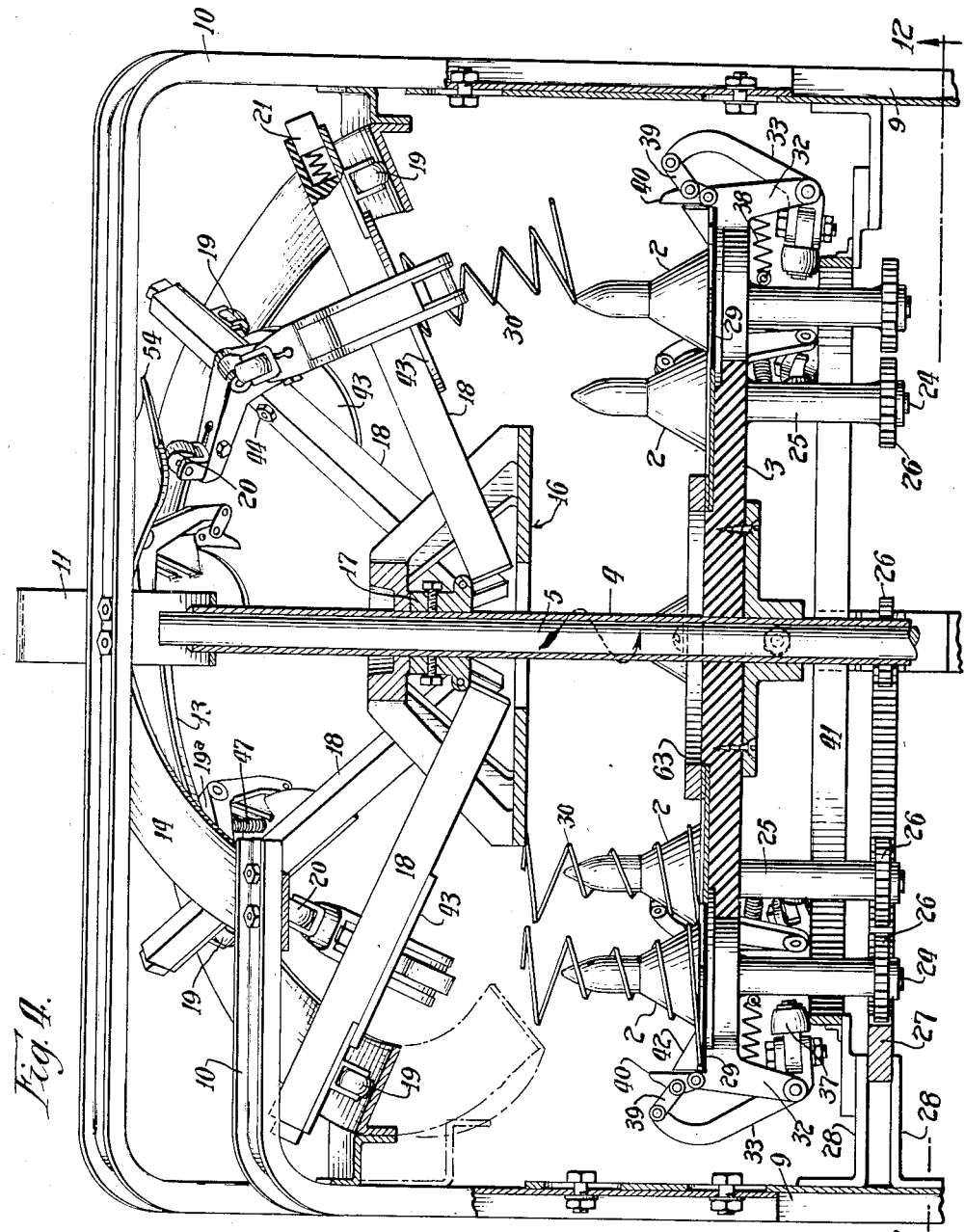
Fig. 4.
Witness:
E. Camporini
Inventor:
Fred R. Zimmerman,
Attorney.

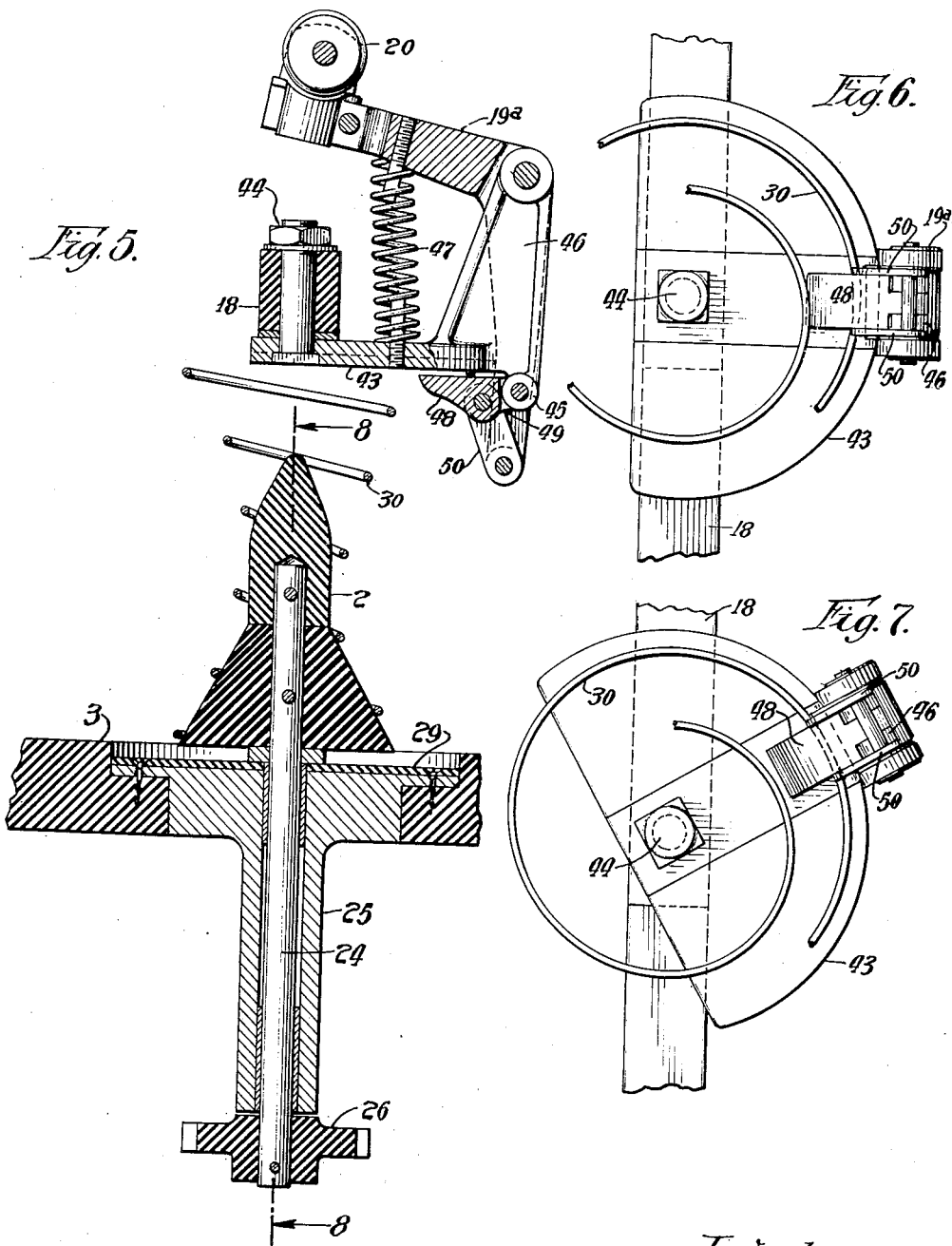

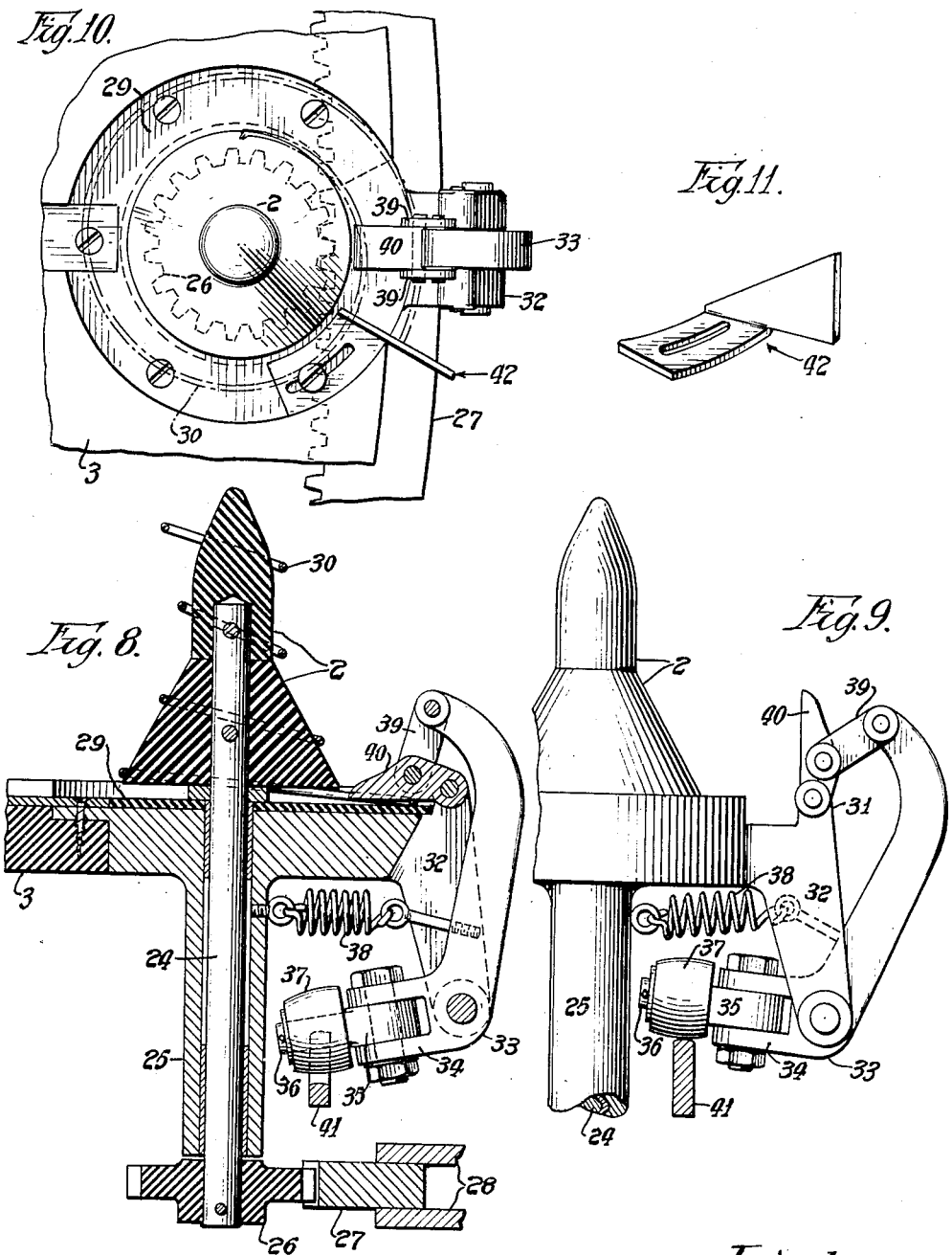

July 19, 1938.  F. R. ZIMMERMAN  2,124,329
SPRING HEATING MACHINE
Filed June 29, 1936   7 Sheets-Sheet 7

Witness:
E. Camporini

Inventor:
Fred R. Zimmerman,
By: Rudolph Jno Lotz
Attorney.

Patented July 19, 1938

2,124,329

UNITED STATES PATENT OFFICE 2,124,329

SPRING HEATING MACHINE

Fred R. Zimmerman, Chicago, Ill., assignor to Nachman Spring-Filled Corporation, Chicago, Ill., a corporation of Illinois Application June 29, 1936, Serial No. 87,891

10 Claims. (Cl. 219—11)

This invention relates to improvements in machines for electrically heating springs for the purpose of hardening the same throughout a predetermined length between the ends thereof, thus to have terminal end portions of predetermined length unhardened and capable of being bent sharply as in coiling said end portions about other springs or other elements, as in the manufacture of spring assemblies for upholstery.

The present invention may be said to constitute an improvement in the particular type of machine described and claimed in and by the pending application of Charles R. Simmons, Serial No. 20,432, filed May 8, 1935 and has for its main objects,

*First.*—To provide a machine of the turntable type wherein the rotatable carrier for the springs is equipped with adjustable means for positioning each of the springs delivered thereto successively so that terminal portions thereof of predetermined length will become positioned beyond the zone of influence of electric current passed through the body of the spring to heat the same to a substantially predetermined temperature.

*Second.*—To provide automatically operated spring engaging devices, and means for connecting the same with the source of electric heating current for engaging the springs at points determined by the spring positioning means in such manner as to assure the flow of electric current through the intended portions of the springs and prevent burning of the springs due to arcs formed at the points of engagement of the springs with said last-named devices thus to insure equal heating of successive springs.

*Third.*—To provide mechanism cooperating with said last-named devices for causing the latter to release the springs successively at a given point in their travel for effecting their discharge from the machine.

Other objects of the invention will be readily understood from the following specification.

In the accompanying drawings illustrating a suitable embodiment of the invention, Fig. 1 is a side elevation, partly in section, of a machine constructed in accordance with the invention.

Fig. 3 and Fig. 4 are vertical sectional views of the same on the lines 3—3 and 4—4, respectively, of Fig. 2.

Fig. 5 is a fragmentary detail vertical sectional view of the same on the line 5—5 of Fig. 2.

Fig. 6 and Fig. 7 are, respectively, fragmentary, detail plan views showing the relative positions of clamping devices for engaging opposite end portions of a spring during travel thereof through a predetermined arc.

Fig. 8 is a view similar to Fig. 7 showing the clamping means for engaging the lower end portion of a spring during travel thereof through a predetermined arc.

Fig. 9 is a fragmentary detail view in elevation showing the clamping means of Fig. 8 in open or spring-releasing position.

Fig. 10 is a fragmentary detail plan view showing the means for positioning springs on the carrier relatively to the clamping means shown in Figs. 5 to 9 inclusive.

Fig. 11 is a perspective view of an adjustable spring stop device determining the last-mentioned positioning of the springs.

In the machine of the aforesaid Simmons application, the springs are fed from a coiler upon truncated cones mounted on a rotatable carrier, and during a portion of their travel, they are partly compressed between two contact rings so spaced from the axis of the cone as to engage the springs at points spaced from their extremities.

The springs are coated, more or less, with an oil film and their contact with the rings is more or less of a needle point nature rather than one of appreciable area. Consequently the flow of current from one of the rings through the body of the spring to the other rings is resisted partially by the oil film and more particularly by the needle point contact between spring and rings which is not of sufficient area to carry the volume of current required to flow through the spring in order to heat the latter to the desired degree.

In consequence of this minute area of contact and oil film, electric arcs form at said points of contact and burn the springs at said points with the result that the wire breaks easily at said points. Another difficulty due to the small areas of contact lies in the resistance to flow of current to the spring which prevents uniform heating of all springs and a consequent lack of uniformity of product. The latter is essentially necessary in the manufacture of spring assemblies for upholstery and all other purposes for which springs are employed.

The present invention is designed to overcome the foregoing as the most important defect of the said Simmons machine, and other defects relating to the delivery of heated springs from the machine.

Figure 3:
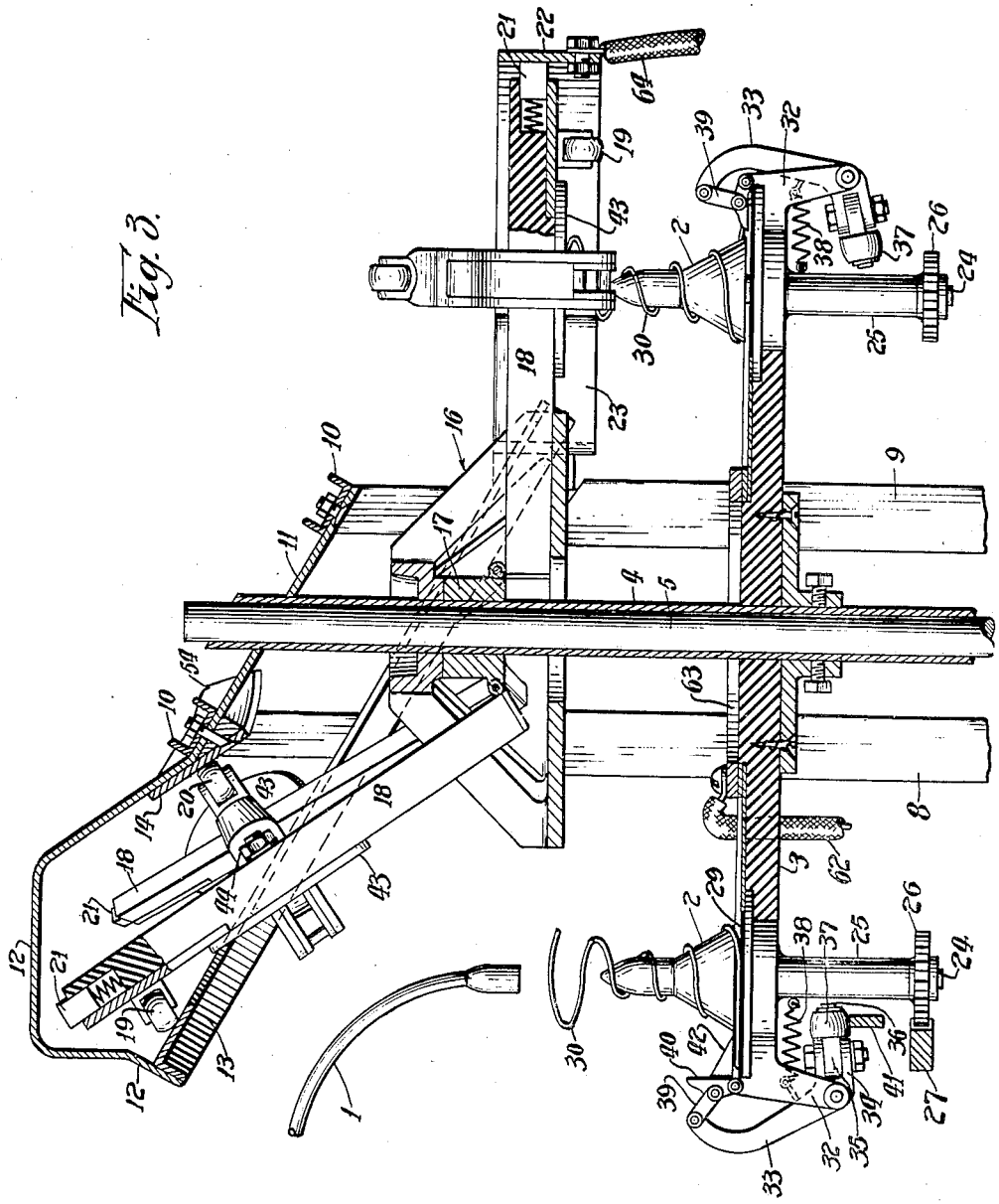

As shown in Fig. 3 the springs delivered from a conventional coiler, not shown, pass over the guide rod (1) onto the spindles (2) which are mounted upon the vertically adjustable continuously rotating turntable (3) carried by the hollow vertical shaft (4). The latter is rotatable on the vertical standard or rigid shaft (5) mounted upon a suitable base (6).

The spindles (2) and turntable (3) are made of a suitable electrically non-conductive material. Said turn-table (3) is suitably geared to a source of power, as for example, by means of a sprocket wheel on the shaft (4) over which the power actuated sprocket chain (7) is trained. The speed of rotation of said turn-table (3) is suitably synchronized with that of the coiler so that the several spindles (2) will be disposed to receive the springs delivered successively from the coiler.

Figure 1:
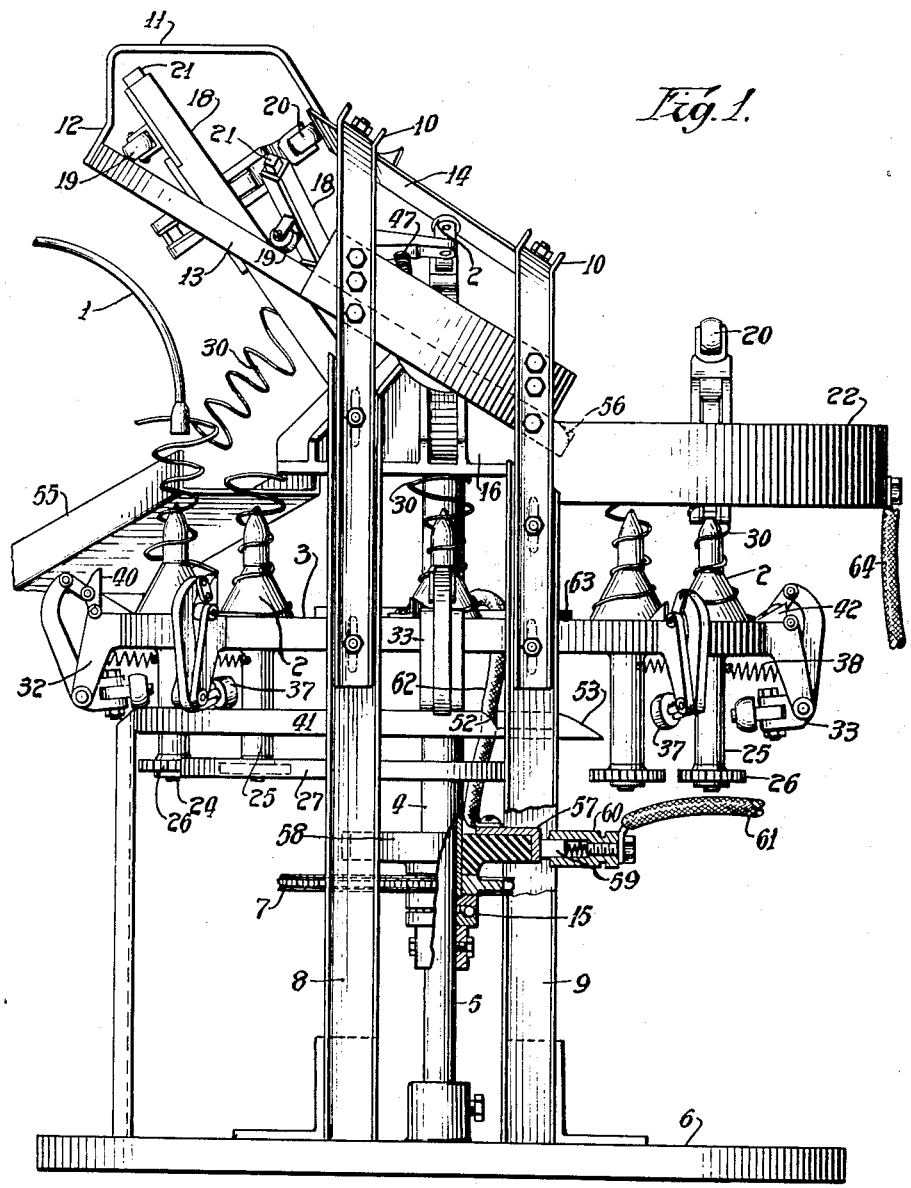
Figure 2:
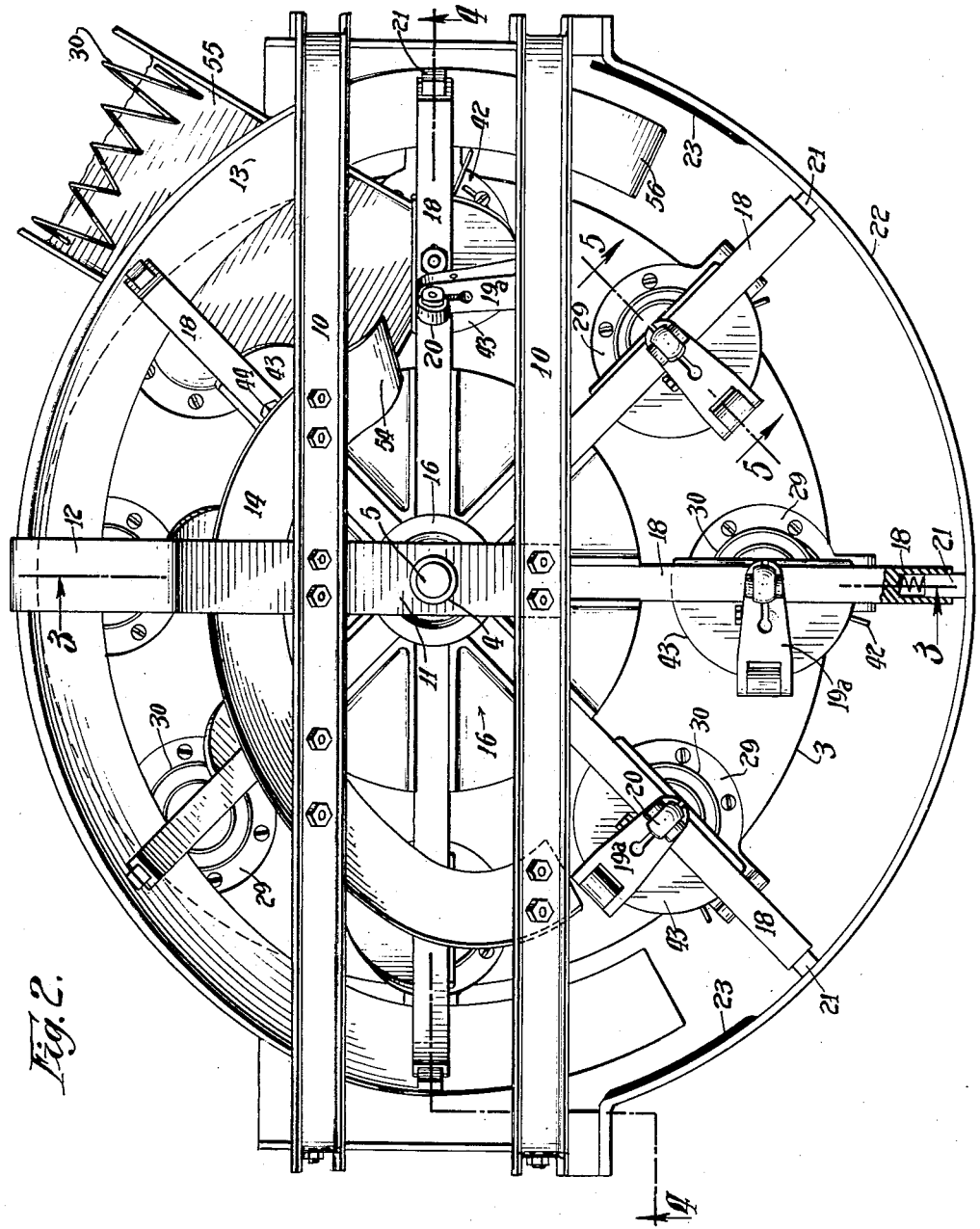
Fig. 2 is a top plan view of the same, also partly in section.

The machine frame comprises the base (6) upon which diametrically opposed pairs of uprights (8) and (9) of respective lengths are mounted. Cross channel bars (10) are mounted upon the upper ends of the uprights (8) and (9) in inclined positions (see Figs. 1 and 2). A flat bar (11) (Figs. 1 and 2) is mounted upon the cross-bars (10) midway between the ends of the latter. The upper ends of the respective shafts (4) and (5) project through an opening in said bar (11). The inverted substantially U-shaped rear end portion (12) of the bar (11) supports the rear end portion of an inclined substantially arcuate cam member (13) (Fig. 2). At a point adjacent the connection of the bar (11) with the rear and higher cross-bar (10), said bar (11) is secured to an inclined substantially arcuate cam member (14) which is disposed forward of and at a higher elevation than the cam member (13).

Said cam members are substantially concentric with the shaft (4) which is carried on a ball or roller bearing (15) mounted upon the rigid shaft (5).

The shaft (4) also carries the vertically and radially slotted head (16) which is supported upon the collar (17)—(Fig. 4). Pivotally secured at their inner ends to said collar (17) is a series of arms (18) which are engaged between their ends in the radial slots of the head (16). The number and spacing apart of said arms (18) and the slots of the head (16) is equal to that of the said spindles (2) so that each of the latter is overhung by the end portion of one of said arms (18). Each of the latter is equipped at its outer end portion with a castor wheel (19) which rides upon the upper face of the cam member (13). The latter controls the vertical swing of said arms (18) during their rotation.

Each of the said arms (18) carries a spring engaging clamping mechanism which is illustrated in detail in Fig. 5 and Fig. 6 and includes a bell-crank lever (19a) equipped at the end of one of its arms with a roller (20) which rides upon the lower face of the cam member (14) during a predetermined arc of travel of said arm (18).

Mounted upon the uprights (8) in the path of the spring projected plungers (21) mounted in the outer extremities of the arms (18), is a suitable arcuate metal plate (22) concentric with the axis of the shaft (4) and which may be said to span the gap between the ends of the cam member (13).

Plates (23) of insulating material are secured to the inner face of the plate (22) along the respective ends of the latter and in the path of the plungers (21) and govern the arc of travel of the arms (18) during which electric heating current flows through the successive springs. The said plate (22) is connected with one side of the source of electric spring heating current, the arms (18) being composed of insulating material. The plungers (21) are electrically connected with the aforesaid clamping mechanisms.

The spindles (2) are mounted upon vertical shafts (24) journalled in bearings (25) carried by the turn-table (3). Each of said shafts (24) is equipped at its lower end with a spur gear pinion (26) of insulating material which, during a short arc of movement of the turn-table (3), meshes with an arcuate rack-bar (27) mounted upon one of the uprights (8) by means of a bracket (28)—(Fig. 4), and similarly to an upright in the front of the machine.

Disposed below each spindle (2) upon the turn-table (3) is a plate of insulating material (29) which is rigid with the said turn-table.

Each spring (30) delivered to a spindle (2) rests at its lower end upon the plate (29) below said spindle.

Rigid with each bearing (25) for the shaft of a spindle (2) is a bracket member having a short upwardly projecting arm (31) and a relatively long downwardly projecting arm (32), both said arms being bifurcated. The elbow of a bell-crank lever (33) is pivotally mounted in the lower end of the arm (34) in which the flat flange (35) of a stud shaft (36) upon which a roller (37) of insulating material is mounted.

The other and longer arm of the bell-crank lever (33) is connected between its ends with the bearing (25) by means of the tension spring (38) and at its upper end said arm is connected by means of a link (39) with the clamping jaw (40) which is connected pivotally with the arm (31) of the bracket.

The spring (38) maintains the jaw (40) normally in spring-engaging position in cooperation with the plate (29).

An arcuate cam member (41) rigid with the frame of the machine and equipped with a downwardly inclined rear end portion—(Fig. 8) disposed in the path of the successive rollers (37), serves to maintain the bell-crank lever and the jaw (40) in the position shown in Fig. 9 and in Fig. 3, (left-hand side), during travel of the spindle (2) past the spring delivery arm (1) and until the pinion (26) has passed out of mesh with the rack-bar (27)—(Fig. 2).

An L-shaped stop (42)—(Fig. 10) equipped with an arcuate slot in its horizontal arm, is mounted upon the plate (29) with its upright arm disposed in the path of the lower extremity of the spring (30), said vertical arm being spaced from the clamping jaw (40) the distance equal to the predetermined length of terminal end portions of springs (30) that are not to be heated, said distance or spacing being adjustable.

Each arm (18) is equipped, adjacent its outer end portion, with the clamping mechanism illustrated in Figs. 5, 6 and 7. Said mechanism comprises a metal plate (43) which is pivotally secured to the lower face of the arm (18) by means of the bolt (44).

Rigid with the plate (43) and disposed at an outer edge portion of the latter is a bracket equipped with a relatively short downwardly projecting arm (45) and a relatively long upwardly projecting arm (46), both said arms being bifurcated. The elbow of the bell-crank lever (19a) is pivotally secured to the upper end of arm (46) and has one of its arms overhanging the plate (43) and equipped with the roller (20). A compression spring (47) is interposed between said last-mentioned arm and the plate (43) to maintain the spring-engaging clamping jaw (48) normally in spring engaging position in cooperation with the plate (43), said jaw being pivotally secured to the bracket arm (45) and being equipped with the projection (49) which is pivotally connected by means of the link (50) with a downwardly projecting arm of the bell-crank lever (19a).

The plate (43) is clamped rigid with the arm (18) but is adjustable arcuately relatively thereto to determine the point in the upper terminal end of spring (30) to be engaged by the jaw (48).

It will be apparent, of course, that vertical adjustment of the turntable (3) is limited to the depth of the arcuate rack-bar (27). Also, by reference to Figs. 1 and 4, it will be seen that the collar (17) is adjustable vertically for purposes of adjusting the position of the head (16) relatively to the turntable (3). Furthermore, the uprights (8) and (9), as shown in Figs. 1 and 4, terminate at a mean level substantially that of the position of the head (16) and that the channel bars (10) are of inverted U-shape and slideably connected with the uprights (8) and (9) by means of the bolts shown in Fig. 1 which extend through slots in said uprights (8) and (9).

The upper portion of the frame of the machine, consisting of said channel bars (10) and the flat bar (12) constitutes the carrier for the cams (13) and (14) so that as said collar (17) and head (16) are raised and lowered relatively to the turntable (3) the said upper portion of the frame will be adjusted similarly so as to maintain said cams (13) and (14) in proper relative positions with respect to the arms (18) and clamping members carried thereby to assure the proper operation of the latter. The purpose of the vertical adjustment of the head (16) is to vary the space between the same and the turntable (3) to accommodate springs of different lengths.

Figure 12:
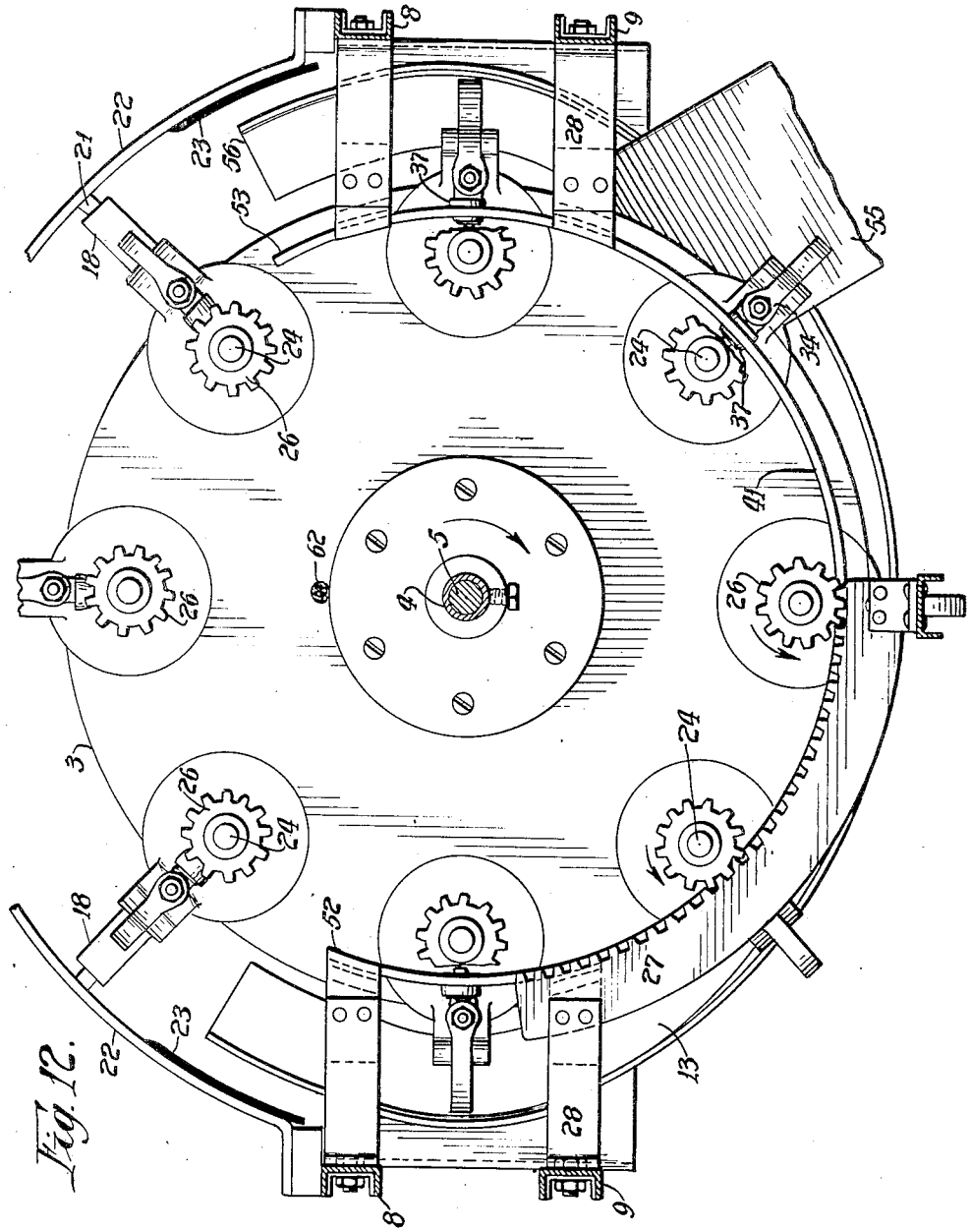
Fig. 12 is an inverted plan section of the machine taken on the line 12—12 of Fig. 4.

From the foregoing description and as shown in the drawings, it will be noted that the several clamping devices are held by their respective springs normally in closed position and by reference to Fig. 12, it will be noted that the length of the arcuate cam member (41) terminates at one inclined end portion (52) at a point between the adjacent end portion of the segmental rack-bar (27) and the plate of insulating material (23) overlying one end portion of the arcuate ring (22). Hence, the clamping devices carried by the turntable (3) will be maintained out of engaging relation to the springs carried on the spindles (2) until the rollers of the said successive clamping members have passed over said end portion (52) of said arcuate cam (41).

The other end portion (53) of said cam member (41) is disposed substantially in radial alignment with the other of the insulating plates (23) of the ring (22) so that as the rollers of the successive last-named clamping members again engage said cam member (41) at this point, said clamping members are disengaged from springs on the turntable (3) and remain in open or non-spring-engaging position until they again reach the end portion (52) of cam (41).

The head (16) must be taken to constitute a part of the turntable (3) since it rotates with the same and the clamping mechanisms thereon cooperate with those on the turntable (3) to engage opposite end portions of springs. It will be noted that the highest point in the cam member (13) is disposed in vertical alignment with the member (1) and that the angle of inclination of said cam member (13) is approximately thirty degrees from a horizontal plane. It will also be noted by reference to Fig. 3 and more particularly by reference to Fig. 2, that the cam member (14) is equipped with an upwardly curved end portion (54) at one end and that this curved end portion is disposed at a point spaced from the end portion (53) of the cam (41) or substantially above the discharge chute (55) shown at the upper right hand corner portion of Fig. 2, but which is spaced at an appreciable distance from the right hand end portion of the ring (22).

Accordingly, after the springs have been heated by the electric current during travel of successive pairs of opposed clamping mechanisms between the opposed ends of the insulating plates (23), that the lower ends of the springs will be released successively from engagement with the clamping members of the turntable (3) and that this release precedes release of the springs from the clamping members of the arms (18). The cam member (13) has its end portion (56) disposed radially opposite the right hand insulating plate (23) at a point between the ends of said plate so that immediately after the plungers (21) of the arms (18) pass into engagement with said last-named insulating plate (23), the rollers of the arms (18) will begin to ride on said cam member (13) and by the time said rollers have become disposed over substantially the middle portion of the chute (55), the spring engaged with the clamping member of the arm (18) reaching this position, will have been withdrawn from its spindle (2) and will be disposed in the inclined or canted position illustrated in Fig. 1. At substantially this point, the clamp engaged with the upper end portion of said springs will have been sprung to open position to disengage the said end portion of the said spring. The latter will then drop by gravity onto said discharge chute (55) which delivers the still hot spring to suitable chilling means not illustrated herein.

The clamping members of the arms (18) are held in open position throughout the arc of travel determined by the cam member (14) until substantially the instant that the clamping members carried by the turntable (3) successively engage the springs. By reference to Fig. 2, it will be noted that the plates (43) and the clamping members carried thereby are disposed to project behind the arms (18) carrying the same with respect to the direction of rotation of said arms so that, as said clamping members are brought gradually into spring-engaging position, they engage the springs at the rearmost points in the upper terminal coils of the latter with respect to direction of rotation, and thus said springs are disposed properly for discharge when they attain discharge position.

The electrical connections are best shown in Fig. 1 where armature member (57) is mounted upon a circular plate (58) of insulating material which is carried by the shaft (4), the hub of which carries the sprocket wheel over which the sprocket chain (7) is trained. A spring-held brush (59) mounted in a socket (60) suitably secured to a frame member, bears against said armature member (57). The socket member is connected by means of a wire (61) with one side of the electric heating circuit, and said armature member is connected by means of wire (62) with a ring (63) on the turntable (3), said ring being suitably electrically connected with the several clamping members on said turntable.

The other side of the electric circuit is connected by wire (64) with the said contact ring (22).

The time interval during which electric heating current passes through the springs between the points of their engagement with the respective clamping members carried by the turntable (3) and arms (18) is determined by the arcuate distance between opposed ends of the insulating plates (23) of ring (22), said plates being interchangeable to vary the said time interval.

Obviously, the turntable may be rotated either continuously or intermittently as elected, the mechanism for actuating said turntable in either manner being omitted from illustration.

I claim as my invention:

1. In a machine of the type specified, a rotatable turntable, a plurality of equally spaced apart rotatable spring engaging spindles mounted on said turntable, a rigid element on the machine frame, a member rigid with each spindle and engaging said element during a part of the rotation of said turntable for rotating the spindles successively thereby to rotate said springs, a stop member associated with each spindle for engagement with a spring extremity for stopping rotation thereof and adjusting the position thereof, clamping mechanisms associated with each spindle for engaging the terminal end portions of each spring after the rotation thereof ceases at points spaced from the extremities thereof, means for actuating said clamping mechanisms to maintain the same in engagement with said springs during a portion of the movement of said turntable following that during which said spindles are rotated successively, an electric circuit and means for connecting opposite sides thereof with said respective clamping mechanisms during the period of their joint engagement with said springs, whereby the said circuit is closed through the portions of the springs disposed between said clamping mechanisms.

2. In a machine of the type specified, a rotatable spring-supporting spindle, mechanism for rotating the same, clamping mechanisms associated with said spindle for engaging opposite end portions of the spring carried thereby, means for maintaining said clamping mechanisms out of engagement with said springs during rotation of said spindle, means associated with said spindle and clamping mechanism for stopping rotation of the spring when the latter has attained a predetermined position relatively to said clamping mechanisms, means for causing said clamping mechanisms to engage the spring after cessation of rotation thereof and maintaining the same engaged therewith during a predetermined time interval and then releasing the same from said engagement, and an electric circuit operatively connected with said clamping mechanisms during the period of their engagement with said spring for closing said circuit through said spring.

3. In a machine of the type specified comprising a carrier for a spring, a stop on said carrier disposed in the path of an extremity of the spring, mechanism for rotating the spring until an extremity thereof engages said stop, clamping mechanisms for engaging opposite end portions of said spring at respective predetermined points therein determined by said stop, means for actuating said clamping mechanisms to engage the spring following cessation of rotation thereof and maintaining the same engaged with said spring during a predetermined time interval and then releasing the same, and an electric circuit operatively connected with said clamping mechanisms during the period of their engagement with said spring for closing said circuit through said spring.

4. In a machine of the type specified comprising a carrier for a spring, cooperating means for rotating the spring relatively to the carrier until said spring has attained a predetermined position on said carrier, clamping mechanisms for engaging opposite end portions of said spring at respective predetermined points therein determined by the position of said spring, means for actuating said clamping mechanisms to engage the spring following cessation of rotation thereof and maintaining the same engaged with said spring during a predetermined time interval and then releasing the same, an electric circuit operatively connected with said clamping mechanism during the period of their engagement with said spring for closing said circuit through said spring.

5. In a machine of the type specified, a carrier for a spring, a member on said carrier engaging within the spring and upon the axis of which the latter is rotatable, a stop on the carrier relatively to which the spring is rotatable in one direction until an extremity of said spring abuts said stop, clamping mechanisms for engaging opposite end portions of the spring at points determined by contact of one extremity of said spring with said stop, means for actuating said mechanisms to cause the same to engage said spring continuously during a predetermined time interval and then release the same, mechanism for effecting a predetermined rate of travel of said carrier for controlling the time interval of engagement of said clamping mechanisms with said spring, an electric circuit and means operatively connecting the same with said respective clamping mechanisms during a predetermined time interval while the latter are engaged with said spring for closing said circuit through said spring.

6. A machine of the type specified including a rotatable carrier, a series of equally spaced apart spindles mounted upon and rotatable relatively to the carrier, and adapted to receive springs successively, rigid means associated with the carrier and operatively associated with said spindles for rotating the latter successively during a given arc of rotation of the carrier whereby to rotate the springs disposed upon said spindles, stops on the carrier disposed adjacent each of the spindles and in the path of an extremity of a spring on the latter for stopping rotation of and maintaining the spring in a predetermined position on the carrier, a pair of clamping mechanisms for each spindle mounted on said carrier, rigid means associated with the carrier for actuating said respective clamping mechanisms to continuously engage opposite end portions of the spring during a predetermined arc of travel of the carrier following cessation of rotation of the spring and then releasing same, an electric circuit and means operatively connecting the same with said respective clamping mechanisms during a predetermined time interval while the latter are engaged with said spring for closing said circuit through said spring.

7. A machine of the type specified including a rotatable carrier, a series of equally spaced apart spindles mounted upon and rotatable relatively to the carrier, and adapted to receive springs successively, rigid means associated with the carrier and operatively associated with said spindles for rotating the latter successively during a given arc of rotation of the carrier whereby to rotate the springs disposed upon said spindles, stops on the carrier disposed adjacent each of the spindles and in the path of an extremity of a spring on the latter for stopping rotation of and maintaining the spring in a predetermined position on the carrier, a pair of clamping mechanisms for each spindle mounted on said carrier, rigid means associated with the carrier for actuating said respective clamping mechanisms to continuously engage opposite end portions of the spring at points determined by said stop, and during a predetermined arc of travel of the carrier following cessation of rotation of the spring and thereafter causing the clamping mechanism nearest adjacent the stop to be disengaged from said end portion of the spring, said last-named rigid means including means for maintaining the other clamping mechanism engaged with said spring and moving the last-named clamping mechanism in a direction and for a distance sufficient to release the spring from said spindle and thereafter releasing the same to effect its discharge from the machine, an electric circuit and means operatively connecting the same with said respective clamping mechanisms during a predetermined time interval while the latter are engaged with said spring for closing said circuit through said spring.

8. A machine of the type specified including a rotatable carrier, a series of equally spaced apart spindles mounted upon and rotatable relatively to the carrier, and adapted to receive springs successively, rigid means associated with the carrier and operatively associated with said spindles for rotating the latter successively during a given arc of rotation of the carrier whereby to rotate the springs disposed upon said spindles, stops on said carrier disposed adjacent each of the spindles and in the path of an extremity of a spring on the latter for stopping rotation of and maintaining the spring in a predetermined position on the carrier, pairs of spring actuated clamps mounted on the carrier and associated with the respective spindles for engaging opposite end portions of springs on said spindles, rigid means associated with said carrier and said clamps for maintaining the latter out of engagement with said springs during a predetermined arc of travel of the carrier and until the springs have ceased rotation and causing said clamps to continuously engage the springs during another predetermined arc of travel of said carrier and then releasing the same, an electric circuit and means operatively connecting the same with said respective clamping mechanisms during a predetermined time interval while the latter are engaged with said spring for closing said circuit through said spring.

9. A machine of the type specified including a rotatable carrier, a series of equally spaced apart spindles mounted upon and rotatable relatively to the carrier and adapted to receive springs successively, rigid means associated with the carrier and operatively associated with said spindles for rotating the latter successively during a given arc of rotation of the carrier whereby to rotate the springs disposed upon said spindles, stops on the carrier disposed adjacent each of the spindles and in the path of an extremity of a spring on the latter for stopping rotation of and maintaining the spring in a predetermined position on the carrier, pairs of spring actuated clamps mounted on the carrier and associated with the respective spindles for engaging opposite end portions of springs on said spindles, rigid means associated with said carrier and said clamps for maintaining the latter out of engagement with said springs during a predetermined arc of travel of the carrier and until the springs have ceased rotation and causing said clamps to continuously engage the springs during another predetermined arc of travel of said carrier and then releasing the one thereof nearest adjacent said stop while maintaining the other thereof engaged with said spring and causing the latter while engaged with said spring to move relatively to the other clamp and the spindle to release said spring from the latter and then release the same to effect its discharge from the machine, an electric circuit and means operatively connecting the same with said respective clamping mechanisms during a predetermined time interval while the latter are engaged with said spring for closing said circuit through said spring.

10. A machine of the type specified including a rotatable carrier, a series of equally spaced apart rotatable spring engaging spindles mounted on said carrier, an arcuate member rigid with the machine frame and disposed for engagement with a part of each spindle for rotating the same and a spring engaged therewith relatively to the carrier during a predetermined arc of travel of the latter, stops on the carrier disposed respectively in the path of an extremity of each of the springs engaged with the respective spindles for stopping rotation of and positioning the springs on the carrier, pairs of spaced apart spring actuated clamps for engaging opposite end portions of the respective springs at points determined by said stops after cessation of rotation of said springs, a pair of rigid arcuate cam members, one thereof disposed in engaging relation to clamps disposed for engaging the end portions of springs nearest adjacent said stops for maintaining said clamps out of engagement with said springs during rotation of the latter and thereafter releasing said clamps to cause the same to continuously engage the springs during another arc of travel of the carrier, the other of said cam members disposed to cause the other set of clamps to engage said springs through a longer arc of travel than said first-named clamps and a third rigid arcuate cam member operatively associated with the last-mentioned set of clamps to cause the same to move away from the first-named set thereof after the latter are released from the springs for disengaging the springs from the spindles and then releasing the same to effect their discharge from the machine, an electric circuit and means operatively connecting the same with said respective clamping mechanism during a predetermined time interval while the latter are engaged with said spring for closing said circuit through said spring.

FRED R. ZIMMERMAN.